(12) United States Patent
Hammargren et al.

(10) Patent No.: US 12,241,313 B2
(45) Date of Patent: Mar. 4, 2025

(54) CONNECTION FOR PERCUSSION DRILLING

(71) Applicant: SANDVIK MINING AND CONSTRUCTION TOOLS AB, Sandviken (SE)

(72) Inventors: John Hammargren, Ockelbo (SE); Andreas Norman, Sandviken (SE)

(73) Assignee: Sandvik Mining and Construction Tools AB, Sandviken (SE)

( * ) Notice: Subject to any disclaimer, the term of this patent is extended or adjusted under 35 U.S.C. 154(b) by 1006 days.

(21) Appl. No.: 16/978,823

(22) PCT Filed: Feb. 22, 2019

(86) PCT No.: PCT/EP2019/054455
§ 371 (c)(1),
(2) Date: Sep. 8, 2020

(87) PCT Pub. No.: WO2019/170437
PCT Pub. Date: Sep. 12, 2019

(65) Prior Publication Data
US 2020/0408048 A1 Dec. 31, 2020

(30) Foreign Application Priority Data
Mar. 9, 2018 (EP) .................... 18160853

(51) Int. Cl.
*E21B 17/042* (2006.01)
*E21B 1/00* (2006.01)
*F16L 15/06* (2006.01)

(52) U.S. Cl.
CPC .......... *E21B 17/0426* (2013.01); *F16L 15/06* (2013.01); *E21B 1/00* (2013.01)

(58) Field of Classification Search
CPC .............................. F16L 15/06; E21B 17/0426
See application file for complete search history.

(56) References Cited

U.S. PATENT DOCUMENTS 4,040,756 A   8/1977 Donegan
4,295,751 A   10/1981 Holmberg
(Continued)

FOREIGN PATENT DOCUMENTS

CN   103015913 A   4/2013
WO   03/097991 A1   11/2003
WO   2007114460 A1   10/2007

*Primary Examiner* — Zachary T Dragicevich
(74) *Attorney, Agent, or Firm* — Corinne R. Gorski

(57) ABSTRACT

A connection for use in percussion drilling includes a male coupling and a female coupling. Each coupling includes a body and a respective screw thread formed on a respective inner or outer surface of the respective body. Each thread has a thread-form including a crest, a root, a contact flank and a non-contact flank. Each thread-form has a contact flank angle and a non-contact flank angle inclined relative to a respective baseline located at a respective minor or major diameter thereof. Each non-contact flank angle is greater than the respective contact flank angle. The crest of each thread-form is inclined from the respective contact flank to the respective non-contact flank such that an apex of the respective thread-form defining a respective minor or major diameter thereof is located adjacent to the respective non-contact flank.

11 Claims, 7 Drawing Sheets

(56) References Cited

U.S. PATENT DOCUMENTS

| | | |
|---|---|---|
| 4,799,844 A | 1/1989 | Chuang |
| 4,861,209 A | 8/1989 | Larsson |
| 5,060,740 A | 10/1991 | Yousef et al. |
| 2001/0029807 A1* | 10/2001 | Linden ................ E21B 17/0426 |
| 2002/0074797 A1* | 6/2002 | Liljebrand .......... E21B 17/0426 |
| 2005/0067195 A1* | 3/2005 | Linden ................ E21B 17/0426 |
| 2010/0140929 A1* | 6/2010 | Nava ....................... F16L 15/06 |
| 2014/0083778 A1 | 3/2014 | Beronius et al. |
| 2016/0032663 A1* | 2/2016 | Benedict ............... E21B 17/042 |
| | | 285/333 |

* cited by examiner

US 12,241,313 B2

CONNECTION FOR PERCUSSION DRILLING

RELATED APPLICATION DATA

This application is a § 371 National Stage Application of PCT International Application No. PCT/EP2019/054455 filed Feb. 22, 2019 claiming priority to EP 18160853.0 filed Mar. 9, 2018.

FIELD OF INVENTION

The present disclosure generally relates to a wear resistant connection for use in percussion drilling.

BACKGROUND

CN103015913 relates to the technical field of drill rods, in particular to an exploration drill rod thread structure with a 12¾-inch ultra-large caliber. The exploration drill rod thread structure includes external threads and internal threads, wherein the external threads are composed of external thread units, the internal threads are composed of internal thread units, the external thread units are composed of first roots and external thread teeth, the internal thread units are composed of second roots and internal thread teeth, the shapes of the external thread teeth and the internal thread teeth mutually correspond, and the external thread teeth and the internal thread teeth are in an abnormal asymmetric structure.

EP 0 009 398/U.S. Pat. No. 4,295,751 discloses a coupling thread structure for percussion drill elements including a rod having an external thread, and a sleeve having an internal thread with the threads, when the sleeve and rod are coupled, having abutting and non-abutting flanks and with the flanks being joined by bottom and crest portions, wherein the threads have at least two starts; the abutting flanks are substantially straight along their whole abutting contact portions and form an angle of between 10° and 25°, preferably 15° to 20°, with the drill axis; the pitch angle of the threads is in the range 9° to 20°, preferably 11° to 16°; the crest portions are substantially straight and intersect the abutting flank portions at a well-defined edge; the non-abutting flanks have a flank angle which is considerably greater than that of the abutting flanks; the flank angle of the non-abutting flanks is in the range 50° to 80°, preferably 65° to 75°, with respect to the drill axis; and the bottom portions of the threads are curved.

EP 0 253 789/U.S. Pat. No. 4,861,209 discloses a threaded coupling for a high frequency percussion drill assembly including a rod and a sleeve having external and internal threads, respectively. The threads are of the asymmetrical type and make contact along opposing shoulder portions disposed on only one side of each crown portion. The threads have a maximum diameter from 30 to 40 mm, a pitch of 7 to 11 mm, and a height from 1.2 to 1.6 mm. The parts of the root and crown portions located immediate adjacent the contacting shoulder portions have radii from 3 to 5 mm.

EP 0 324 442/U.S. Pat. No. 4,799,844 discloses a screw structure provided for male and female threads having at least one thread extending helically along a cylindrical support member in spaced thread turns. A root portion extends between adjacent thread turns and has a curvature defined by a portion of an ellipse for providing improved stress reduction during periods of severe loading.

EP 2 710 217/US 2014/0083778 discloses a device in a drill string component for percussive rock drilling including a thread for threading together with another drill string component including a complementary thread. The thread includes a thread groove formed by two thread flanks and an intermediate thread bottom. In operation one of the flanks forms a pressure flank. The thread groove has an essentially equally shaped sectional form along its axial extension. The thread bottom exhibits at least three surface portions with part-circular shape, as seen in an axial section. The surface portions with part-circular shape have increasing radiuses, as seen from each thread flank to an intermediate surface portion of the thread bottom. Also a thread joint and a drill string component.

U.S. Pat. No. 4,040,756 discloses a thread structure for use in coupling percussion drilling extension rods minimizes the torque necessary to disconnect such extension rods. This is accomplished by beveling the crest portions of the cooperating thread structures. The direction of the bevel is such that the greatest intrusion of the crest portions into the complementary portions of the cooperating thread structure occurs immediately adjacent the abutting flanks thereof. The abutting flanks then wear in such a way that wedging is substantially avoided. Additionally, the root portions are defined by a continuously curved surface that smoothly extends into a flat surface defining the thread flanks so that fatigue stresses are minimized.

The prior art generally fails to take into consideration the performance of the threads as they become worn. Accordingly, it is desirable to provide an improved drill string thread for percussion rock drilling that does not suffer from the shortcomings of the prior art.

SUMMARY OF THE INVENTION

The present disclosure generally relates to a wear resistant connection for percussion drilling. In one embodiment, a connection for percussion drilling includes a male coupling and a female coupling. Each coupling includes a body and a respective screw thread formed on a respective inner or outer surface of the respective body. Each thread has a thread-form including a crest, a root, a contact flank and a non-contact flank. Each thread-form has a contact flank angle and a non-contact flank angle inclined relative to a respective baseline located at a respective minor or major diameter thereof. Each non-contact flank angle is greater than the respective contact flank angle. The crest of each thread-form is inclined from the respective contact flank to the respective non-contact flank such that an apex of the respective thread-form defining a respective major or minor diameter thereof is located adjacent to the respective non-contact flank.

Advantageously, as compared to the prior art discussed above, due to the inclined crests of the thread-forms, the contact flanks become enlarged in response to wear of the couplings. Further, pitting formed in regions adjacent to the contact flanks may be removed as a result of the wear.

The CN'913 application does not identify the contact flanks and the non-contact flanks. The EP '398 patent discloses a main embodiment where the threads have straight crests and an alternative where the crests are declined. The EP '789 patent discloses threads with semi-circular crests. The EP '442 patent discloses threads with straight crests. The EP '217 patent discloses threads with straight crests. The US '756 patent discloses threads with declined crests and teaches away from inclined crests by emphasizing the need for the declined crests to avoid wedging of the threads in the worn condition.

In one aspect of the embodiment, each contact flank angle ranges between 15 and 50 degrees and each non-contact flank angle equals the respective contact flank angle plus 5 to 30 degrees.

In another aspect of the embodiment, the inclination of each crest is arcuate with a radius greater than 10 percent of an outer diameter of the male coupling. In another aspect of the embodiment, the inclination of each crest is linear.

In another aspect of the embodiment, a height of each crest adjacent to the respective non-contact flank is 5 to 20 percent greater than a height of the respective crest adjacent to the respective contact flank.

In another aspect of the embodiment, each root is a first arc, and each contact flank is connected to the respective root by a respective second arc. Optionally, a first radius of each first arc is greater than a second radius of the respective second arc. Optionally, each first radius is at least 50 percent greater than the respective second radius, and each second radius is greater than five percent of an outer diameter of the male coupling. None of the prior art references discussed above disclose such a dual-arc configuration.

In another aspect of the embodiment, an area of the male thread-from is at least two percent greater than an area of the female thread-form.

In another aspect of the embodiment, each non-contact flank is connected to the respective crest by a respective arc.

In another aspect of the embodiment, an outer diameter of the couplings ranges between two and 16 centimeters.

In another aspect of the embodiment, each diameter is constant.

In another aspect of the embodiment, a drill rod for percussion drilling includes: a rod body; the female coupling integrally formed with or welded to a first end of the rod body; and the male coupling integrally formed with or welded to a second end of the rod body.

In another aspect of the embodiment, a drill string comprising a drill rod.

In another aspect of the embodiment, a drill rod for percussion drilling includes: a rod body; the female coupling integrally formed in a first end of the rod body; and the male coupling integrally formed in a second end of the rod body.

BRIEF DESCRIPTION OF DRAWINGS

A specific implementation of the present invention will now be described, by way of example only, and with reference to the accompanying drawings in which.

DETAILED DESCRIPTION

Figure 1A:
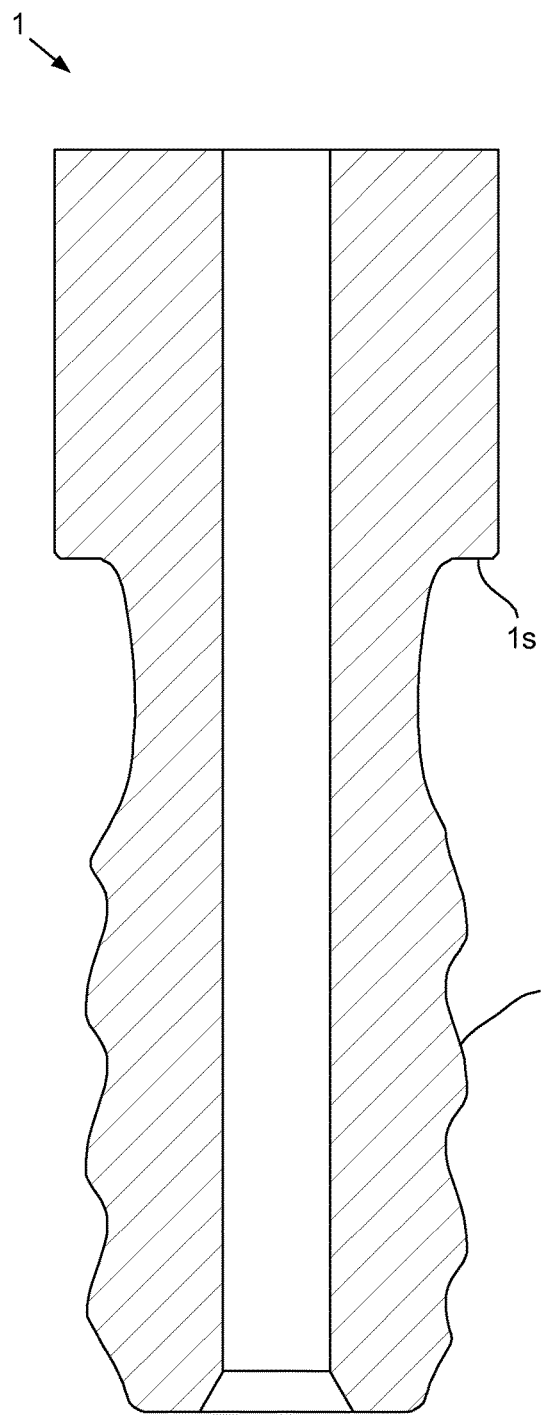
FIGS. 1A and 1B illustrate a male coupling and a female coupling for a percussion drill string, each coupling including a wear resistant screw thread, according to one embodiment of the present disclosure.
Figure 1B:
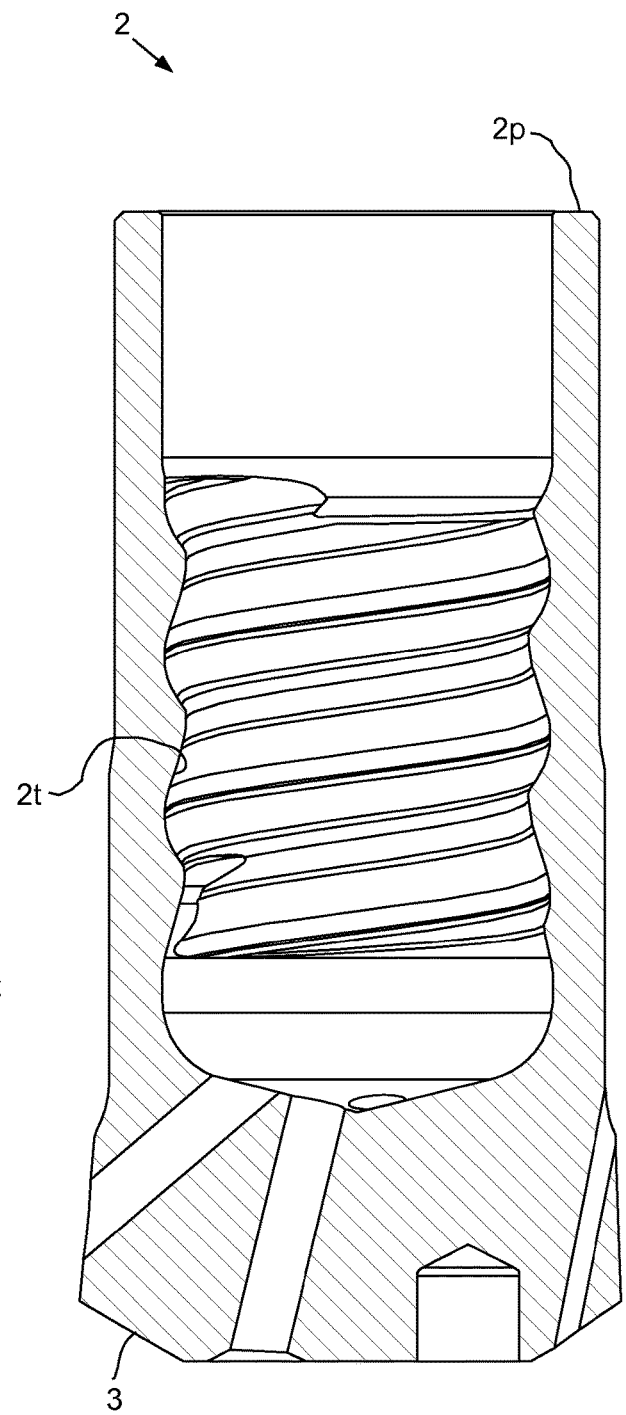

FIGS. 1A and 1B illustrate a male coupling 1 and a female coupling 2 for a percussion drill string, each coupling including a wear resistant screw thread 1*t*, 2*t*, according to one embodiment of the present disclosure. The percussion drill string may be formed by screwing together a plurality of drill rods (FIG. 4) together along with a percussion drill bit 3 at one end and a shank adapter (not shown) at the other end. The drill rods may be screwed together using the male 1 and female couplings 2. The drill string may be used for percussion rock drilling with a top hammer (not shown) or downhole hammer (not shown). If a downhole hammer is used, the hammer may have each of the wear resistant screw threads 1*t*, 2*t* for assembly as part of the drill string.

The male coupling 1 may be attached, such as welded, to an intermediate rod body so as to form a longitudinal end of a drill rod. The female coupling 2 may be formed integrally with the percussion drill bit 3. The male coupling 1 may have a tubular body with an outer diameter upper portion for connection to a lower end of the rod body, a reduced diameter lower portion having the external male thread 1*t* formed in an outer surface thereof, and a shoulder is connecting the upper and lower portions. The male thread 1*t* may start at a first standoff distance from the shoulder 1*s*. The male thread 1*t* may end at a second standoff distance from a bottom thereof. A guide portion, such as a conical surface, may be formed in the outer surface of the lower portion of the male coupling 1 between the end of the male thread 1*t* and the bottom thereof. The upper portion of the male coupling 1 may have a plurality of wrench flats (not shown) formed in an outer surface thereof. The male coupling 1 may have a flow bore formed therethrough. An outer diameter of the couplings 1, 2 may range between two and 16 centimeters.

The female coupling 2 may serve as the shank of the percussion drill bit 3. The percussion drill bit 3 may further include a head. The head may have an outermost end defining a cutting face. The cutting face may have a plurality of sockets (only one shown) formed therein for receiving crushers (not shown). Each crusher may be a pre-formed insert mounted into the respective socket by interference fit or brazing. Each cutter may be made from a cermet material, such as a cemented carbide. The sockets and cutters may be spaced about the cutting face.

Figure 2:
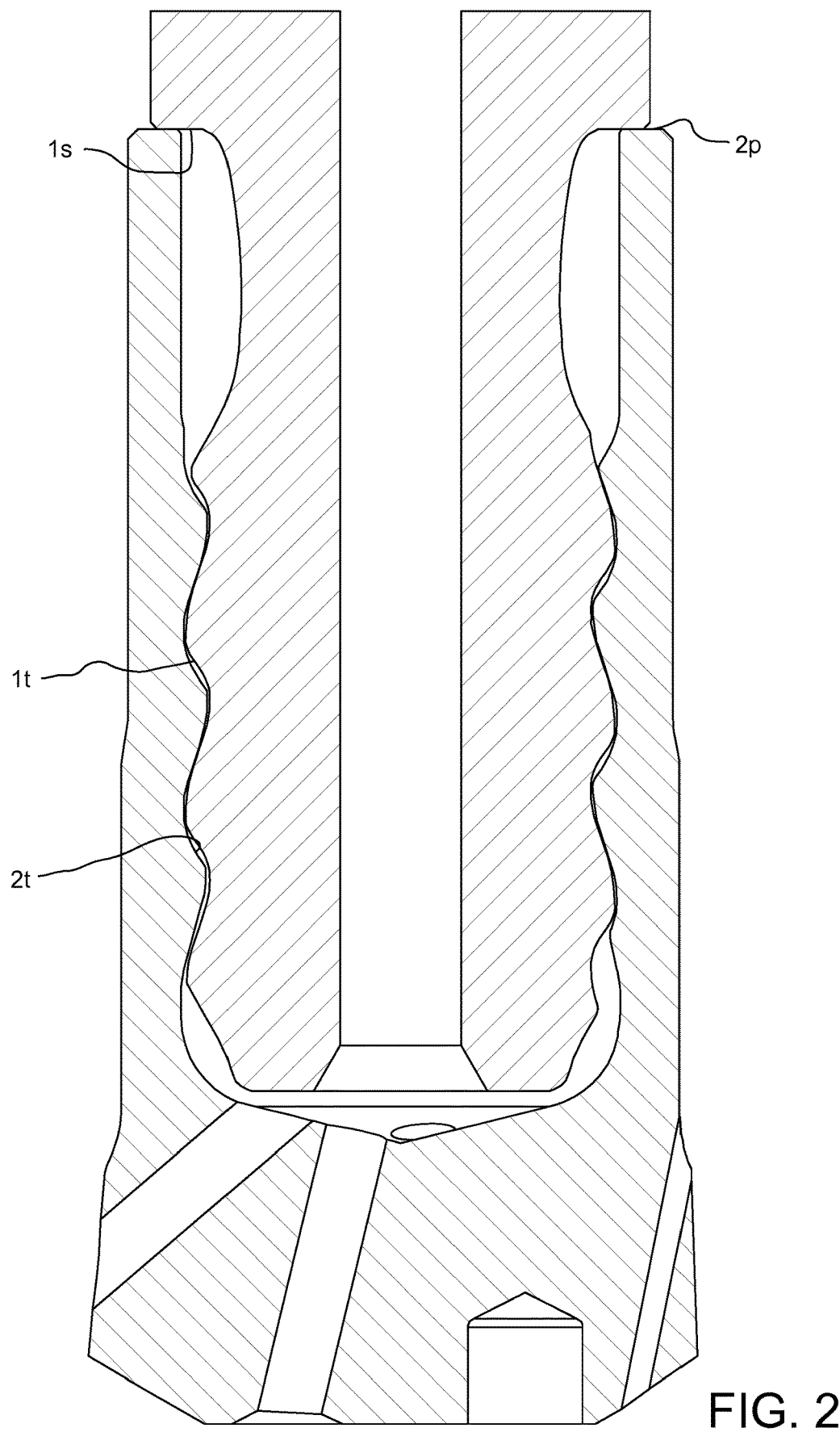
FIG. 2 illustrates the male and female couplings screwed together.

FIG. 2 illustrates the male 1 and female 2 couplings screwed together. The female coupling 2 may have a tubular body. The female coupling 2 may have the internal female thread 2*t* formed in an inner surface thereof adjacent to the flow bore thereof. The flow bore may be sized to receive the reduced diameter lower portion of the male coupling 1. The male coupling 1 may be screwed into the female coupling 2 until the shoulder 1*s* abuts a top 2*p* of the female coupling, thereby creating a metal-to-metal seal for isolating the flow bore and fastening the two members together. The female thread 2*t* may start at a first standoff distance from the top 2*p*. The female thread 2*t* may end at a second standoff distance from a bottom of the female coupling 2. The flow bore of the female coupling 2 may be in fluid communication with flow ports formed through the head of the drill bit. Each of the male 1*t* and female 2*t* threads may be single threads.

Figure 3A:
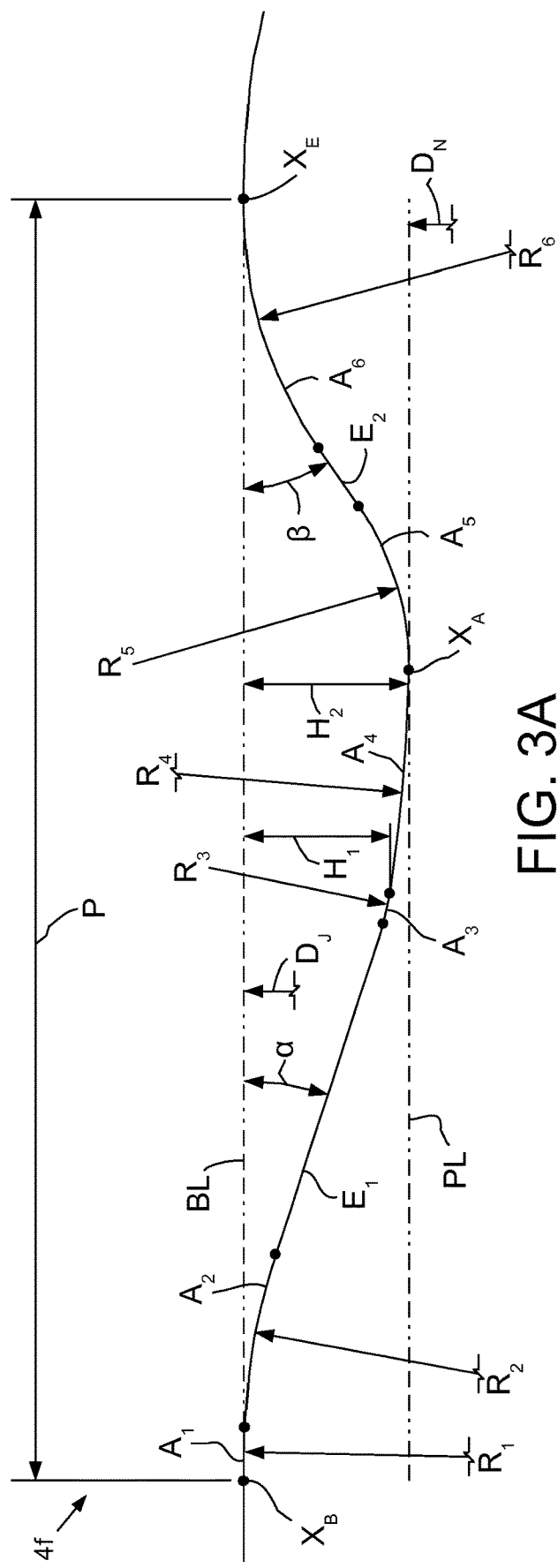
FIG. 3A illustrates a thread-form of the female thread.
Figure 3B:
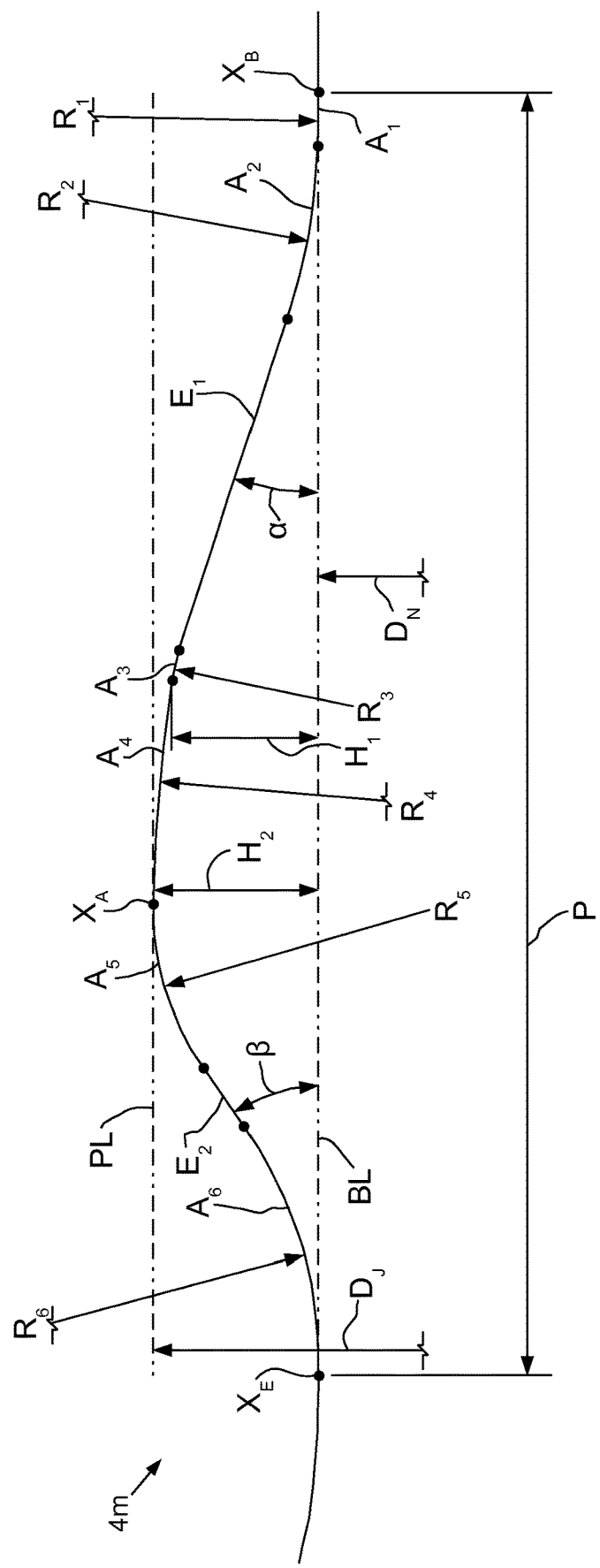
FIG. 3B illustrates a thread-form of the male thread.

FIG. 3A illustrates a thread-form 4*f* of the female thread 2*t*. FIG. 3B illustrates a thread-form 4*m* of the male thread 1*t*. Each thread-form 4*m*,*f* may start at point $X_B$ and may include a root $A_1$. Each root $A_1$ may be a concave arc with a respective radius $R_1$ and may extend to a respective second arc $A_2$. Each second arc $A_2$ may be concave, have a respective radius $R_2$, and may extend from the respective first crest $A_1$ to a respective contact flank $E_1$. Each root radius $R_1$ may be greater than the respective second radius $R_2$, such as at least fifty percent greater than the respective second radius. Each second radius $R_2$ may be greater than five percent of the outer diameter of the male coupling 1. This dual arc configuration may significantly stress in the root region of the respective thread-form 4m, 4f. Each contact flank $E_1$ may be a straight line inclined at a respective first flank angle $\alpha$ relative to a respective baseline BL. The baseline BL may be longitudinal and be located at a respective major diameter $D_J$ or minor diameter $D_N$ of the respective thread 1t, 2t. Each first flank angle $\alpha$ may range between 15 and 50 degrees. Each contact flank $E_1$ may extend from the respective second arc $A_2$ to a respective third arc $A_3$. Each third arc $A_3$ may be convex and have a respective radius $R_3$.

Each third arc $A_3$ may extend from the respective contact flank $E_1$ to a respective crest $A_4$. Each crest $A_4$ may have a respective first height $H_1$ adjacent to the respective third arc $A_3$ and a respective second height $H_2$ adjacent to a respective fifth arc $A_5$. Each height $H_1, H_2$ may be measured from the respective baseline BL. Each crest $A_4$ may be inclined from the respective contact flank $E_1$ to the respective non-contact flank $E_2$ such that a respective apex $X_A$ of the respective thread-form 4m, 4f defining the respective major diameter $D_J$ or minor diameter $D_N$ is located adjacent to the respective non-contact flank. Each thread-form 4m, 4f may have a respective peak line PL which may be longitudinal and be located at the respective major diameter $D_J$ or minor diameter $D_N$ of the respective thread 1t, 2t. Each diameter $D_N$, $D_J$ of the respective thread 1t, 2t may be constant. Due to the inclination of each crest $A_4$, the respective second height $H_2$ may be greater than the respective first height $H_1$. Each inclination may be accomplished by the respective crest $A_4$ being a convex arc with a respective radius $R_4$. Each crest radius $R_4$ may be greater than ten percent of the outer diameter of the male coupling 1. Each crest $A_4$ may extend from the respective third arc $A_3$ to a respective fifth arc $A_5$. Each second height $H_2$ may be 5 to 20 percent greater than the respective first height $H_1$.

Alternatively, each crest $A_4$ may be linearly inclined.

Each fifth arc $A_5$ may be convex, may have a respective radius $R_5$, and may extend from the respective crest $A_4$ to a respective non-contact flank $E_2$. Each non-contact flank $E_2$ may be a straight line inclined at a respective second flank angle $\theta$ relative to the respective baseline BL. Each second flank angle $\beta$ may be greater than the respective first flank angle $\alpha$, such as 5 to 30 degrees greater than the respective first flank angle, thereby resulting in an respective asymmetric thread-form 4m, 4f. Each non-contact flank $E_2$ may extend from the respective fifth arc $A_5$ to a respective sixth arc $A_6$. Each sixth arc $A_6$ may extend from the respective non-contact flank $E_2$ to a respective end point $X_E$. Each sixth arc $A_6$ may be concave and have a respective radius $R_6$. Each thread-form 4m, 4f may have a respective pitch P defined by a longitudinal distance between the respective start point $X_B$ and the respective end point $X_E$. Each pitch P may be greater than the outer diameter of the male coupling 1.

An area of the male thread-from 4m may be at least two percent greater or even at least five percent greater than an area of the female thread-form 4f. This enlargement of the male thread-form 4m may increase the service life of the drill rods since the male thread-form is usually determinative.

Figure 4:
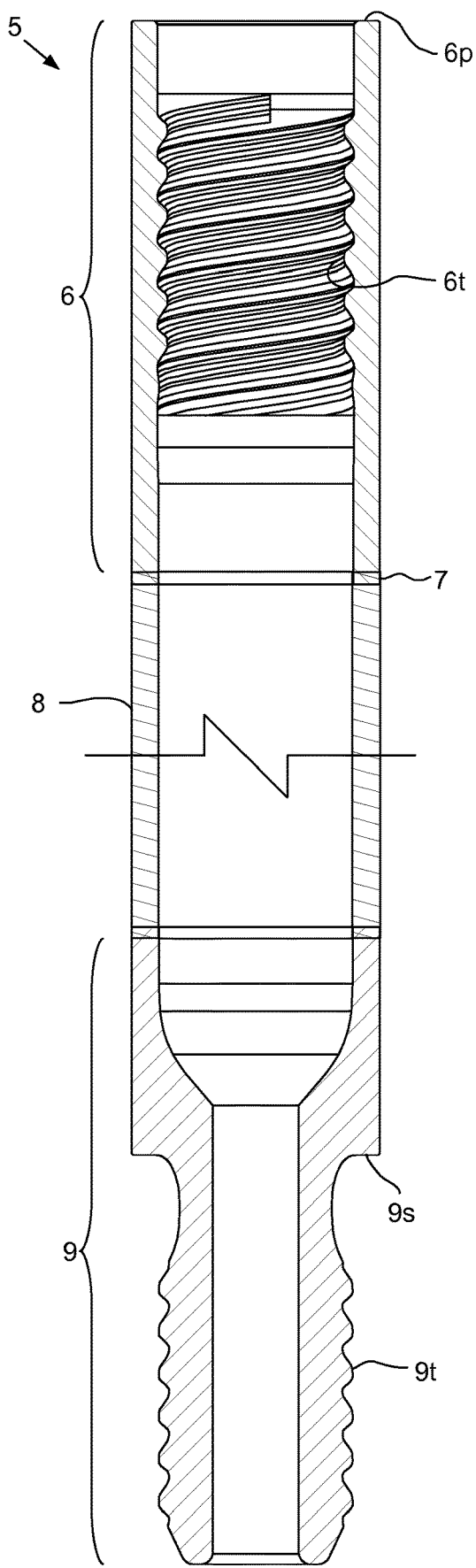
FIG. 4 illustrates a drill rod having a second male coupling and a second female coupling, each coupling including a second wear resistant screw thread, according to another embodiment of the present disclosure.

FIG. 4 illustrates a drill rod 5 having a female coupling 6 and a male coupling 9, each coupling including a respective wear resistant screw thread 6t, 9t, according to another embodiment of the present disclosure. The drill rod 5 may be made from a metal or alloy, such as steel. The drill rod 5 may also be case hardened, such as by carburization. Each coupling 6, 9 may be attached, such as welded 7, to an intermediate rod body 8 so as to form longitudinal ends of the drill rod 5. The drill rod 5 may have a flow bore formed therethrough. The drill rod 5 may have a length of 6 meters. An outer diameter of the couplings 6, 9 may range between five and 15 centimeters.

A drill string may be formed by screwing together a plurality of drill rods 5 together (FIG. 5) along with a drill bit at one end and a shank adapter at the other end. The drill bit and shank adapter may also have either of the wear resistant screw threads 6t, 9t. The drill string may be used for percussion rock drilling with a top hammer (not shown) or downhole hammer (not shown). If a downhole hammer is used, the hammer may have each of the wear resistant screw threads 6t, 9t for assembly as part of the drill string.

Alternatively, the drill rod 5 may have a pair of male couplings 9 and a sleeve (not shown) having a pair of female couplings 6 may be used to connect a pair of drill rods together. Alternatively, the drill bit may be connected to the bottom drill rod using the couplings 1, 2. Alternatively, each coupling 6, 9 may be formed integrally with the rod body 8 instead of welded thereto.

The male coupling 9 may have a tubular body with an outer diameter upper portion for connection to a lower end of the rod body 8, a reduced diameter lower portion having the external male thread 9t formed in an outer surface thereof, and a shoulder 9s connecting the upper and lower portions. The male thread 9t may start at a first standoff distance from the shoulder 9s. The male thread 9t may end at a second standoff distance from a bottom thereof. A guide portion, such as a conical surface, may be formed in the outer surface of the lower portion of the male coupling 9 between the end of the male thread 9t and the bottom thereof. The upper portion of the male coupling 9 may have a plurality of wrench flats (not shown) formed in an outer surface thereof. The flow bore in the upper portion may include a nozzle and a portion of a throat. The throat may extend through the shoulder 4s and the lower portion.

Figure 5:
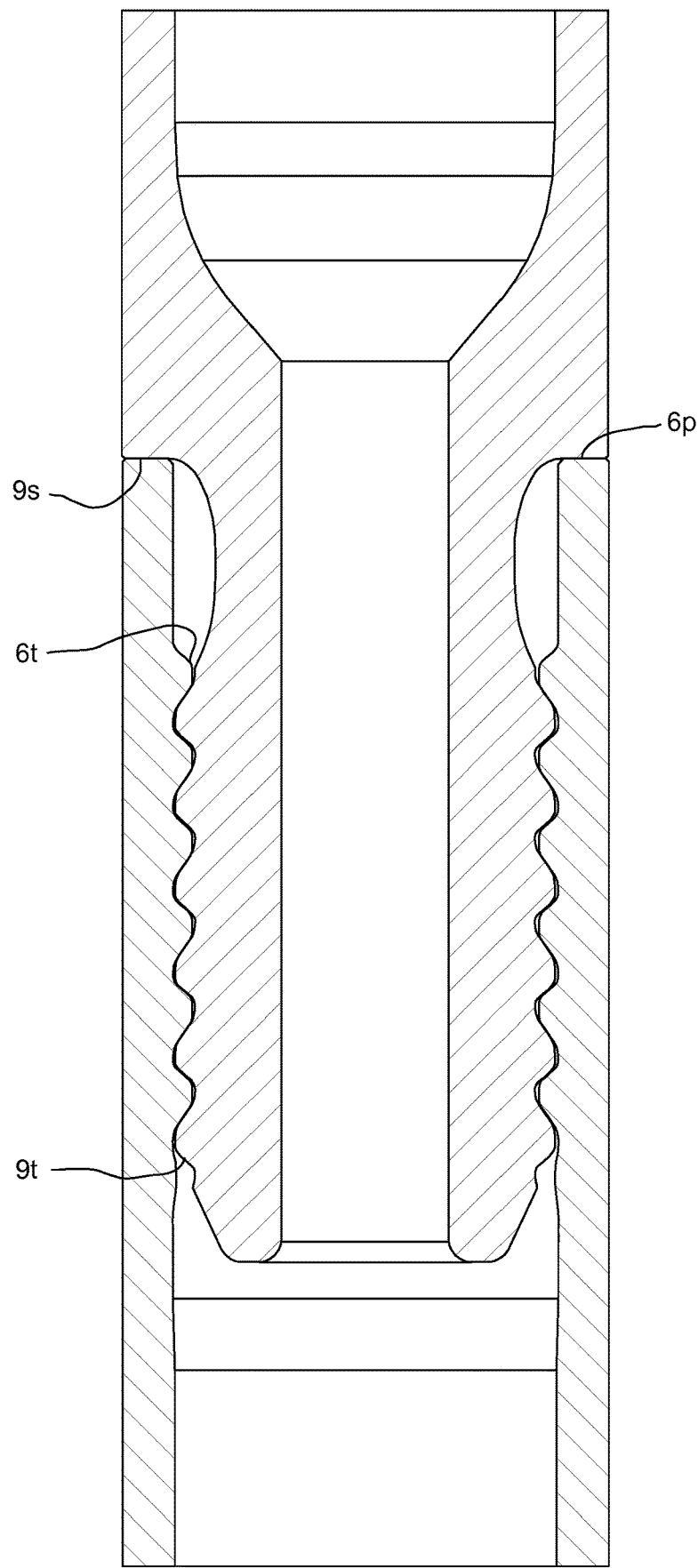
FIG. 5 illustrates the second male and female couplings screwed together.

FIG. 5 illustrates the male 9 and female 6 couplings screwed together. The female coupling 6 may have a tubular body with a lower portion for connection to an upper end of the rod body 8. The female coupling 6 may have the internal female thread 6t formed in an inner surface thereof adjacent to the flow bore thereof. The flow bore may be sized to receive the reduced diameter lower portion of the male coupling 9 of another drill rod. The male coupling 9 may be screwed into the female coupling 6 until the shoulder 9s abuts a top 6p of the female coupling, thereby creating a metal-to-metal seal for isolating the flow bore and fastening the two drill rods together. The female thread 6t may start at a first standoff distance from the top 6p. The female thread 6t may end at a second standoff distance from a bottom of the female coupling 6. The flow bore of the female coupling 6 may include a diffuser located adjacent to a lower end of the female thread 6t. Each of the female 6t and male 9t threads may be double threads.

Alternatively, each of the female 6t and male 9t threads may be a single thread or triple threads. Alternatively, the male coupling 9 may be connected to an upper end of the rod body 8 and the female coupling 6 may be connected to a lower end of the rod body. In this alternative, the nozzle of the male coupling 9 would be a diffuser and the diffuser of the female coupling 6 would be a nozzle. Alternatively, any of the threads 1t, 2t, 6t, 9t may be used to connect non-tubular members of the drill string.

Figure 6A:
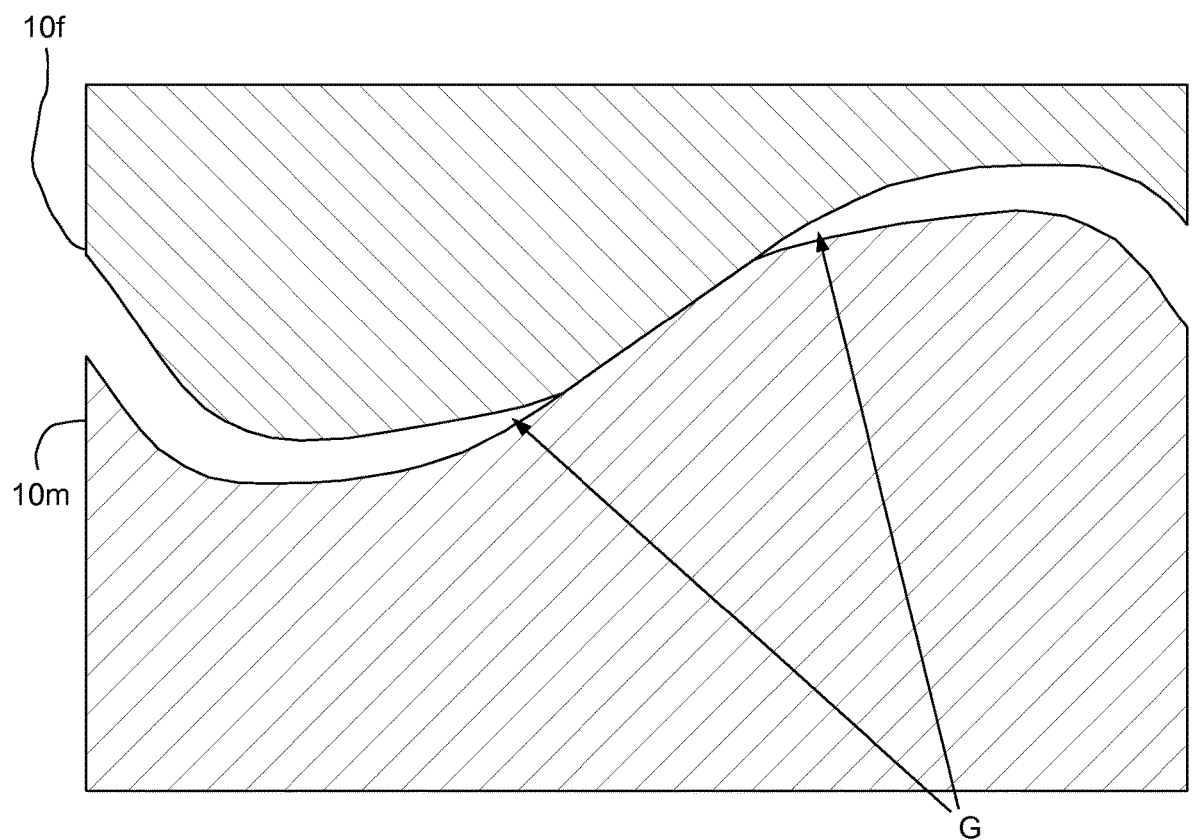
FIG. 6A illustrates male and female thread-forms of the second couplings screwed together in a new condition.

FIG. 6A illustrates the male 10m and female 10f thread-forms of the second couplings 6, 9 screwed together in a new condition. Each thread-form 10m, 10f of the respective second couplings 6, 9 may be similar to the respective thread-forms 4m, 4f including the root, the crest, the contact flank, the non-contact flank, and the various arcs connecting the members. Each second thread-form 10m, 10f may include the inclined crest and asymmetry of the respective thread-form 4m, 4f within the parameters discussed above. The pitch of each second thread-form 10m, 10f may be less than that of the respective thread-form 4m,f and the height of the apex of each second thread-form 10m, 10f may be greater than that of the respective thread-form 4m, 4f.

Figure 6B:
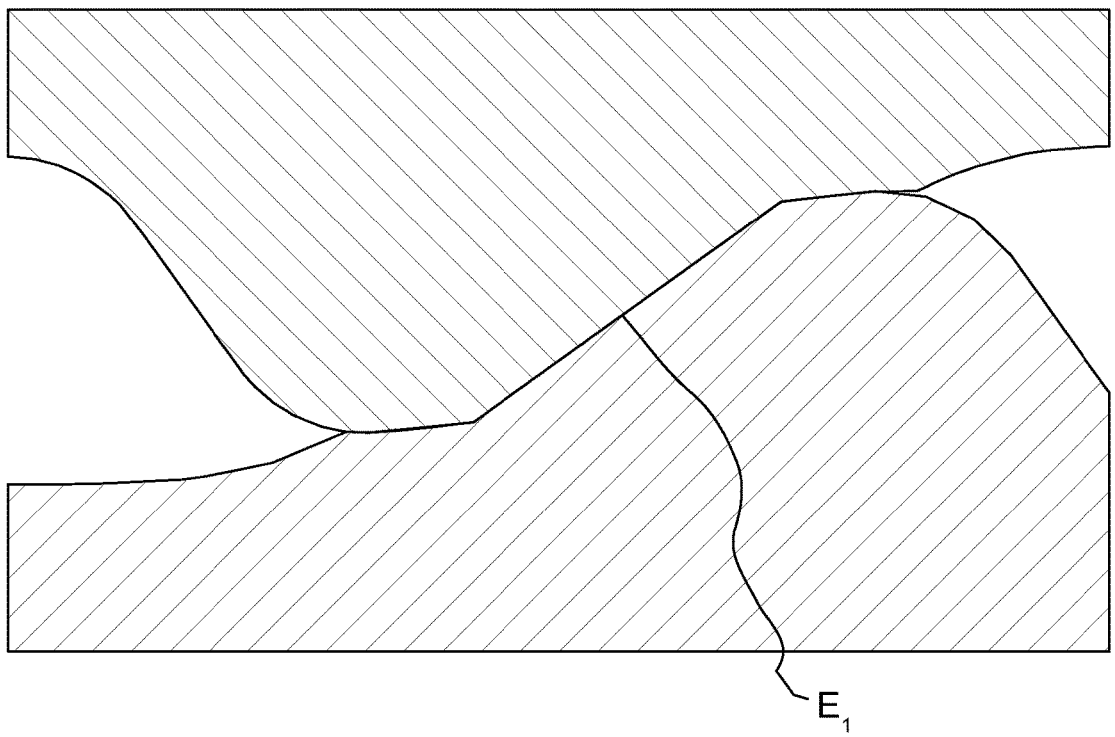
FIG. 6B illustrates the male and female thread-forms in a worn condition.

FIG. 6B illustrates the male 10m and female 10f thread-forms in a worn condition. Due to the inclined crests of each second thread-form 10m, 10f, the contact flanks $E_1$ may become enlarged in response to wear of the second couplings 6, 9. Further, pitting formed in regions G adjacent to the contact flanks $E_1$ may be removed as a result of the wear. The enlarged flanks may decrease contact pressure and, in conjunction with the removed pits, may decrease risk of failure.

The invention claimed is:

1. A connection for percussion drilling comprising:
a male coupling including a body and a male screw thread formed on an outer surface of the body; and
a female coupling including a body and a female screw thread formed in an inner surface of the body, wherein each of the male and female screw threads has a thread-form including a crest, a root, a contact flank and a non-contact flank, each thread-form having a contact flank angle and a non-contact flank angle inclined relative to a respective baseline located at a respective minor diameter or major diameter thereof, each non-contact flank angle being greater than the respective contact flank angle, wherein the crest of each thread-form is inclined from the respective contact flank to the respective non-contact flank such that an apex of the respective thread-form defining the respective minor diameter and major diameter thereof is located adjacent to the respective non-contact flank, wherein each root has a first arc, and each contact flank is connected to the respective root by a respective second arc, and wherein a first radius of each first arc is greater than a second radius of the respective second arc only on the contact flank, wherein the non-contact flank has an additional single arc having just one radius, the additional single arc being tangent with the non-contact flank.

2. The connection according to claim 1, wherein each contact flank angle ranges between 15 and 50 degrees and each non-contact flank angle equals the respective contact flank angle plus 5 to 30 degrees.

3. The connection according to claim 1, wherein the inclination of each crest is arcuate with a radius greater than 10% of an outer diameter of the male coupling.

4. The connection according to claim 1, wherein a height of each crest adjacent to the respective non-contact flank is 5%-20% greater than a height of the respective crest adjacent to the respective contact flank.

5. The connection according to claim 1, wherein each first radius is at least 50% greater than the respective second radius, and each second radius is greater than 5% of an outer diameter of the male coupling.

6. The connection according to claim 1, wherein an area of the male thread-form is at least 2% greater than an area of the female thread-form.

7. The connection according to claim 1, wherein each non-contact flank is connected to the respective crest by a respective arc.

8. The connection according to claim 1, wherein an outer diameter of the female part in the region of the couplings ranges between 2 and 16 cm.

9. The connection according to claim 1, wherein each of the minor and major diameters is constant.

10. A drill rod for percussive drilling comprising:
a rod body;
a female coupling according to claim 1 integrally formed with or welded to a first end of the rod body; and
a male coupling according to claim 1 integrally formed with or welded to a second end of the rod body.

11. A drill string comprising a drill rod according to claim 10.

* * * * *